P. F. Schenck.
Air Supplying Apparatus to Life Boat.
No. 65,953. Patented Jun. 18, 1867.
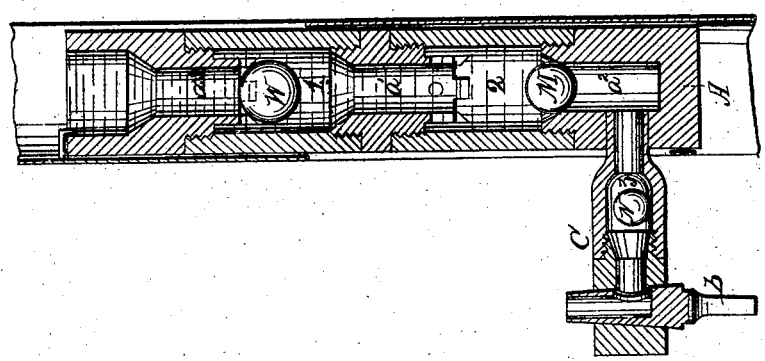
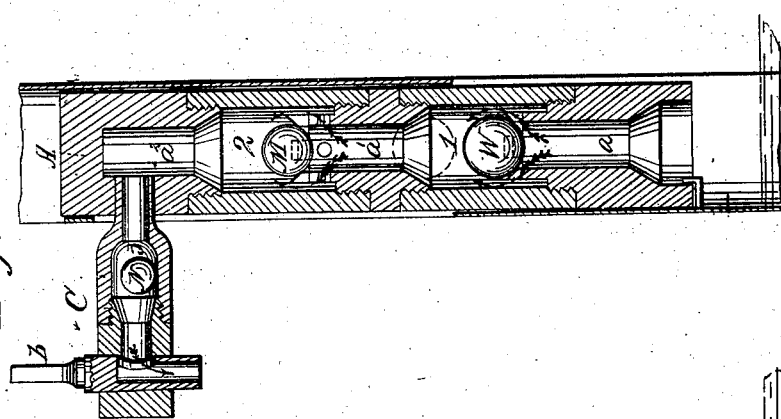
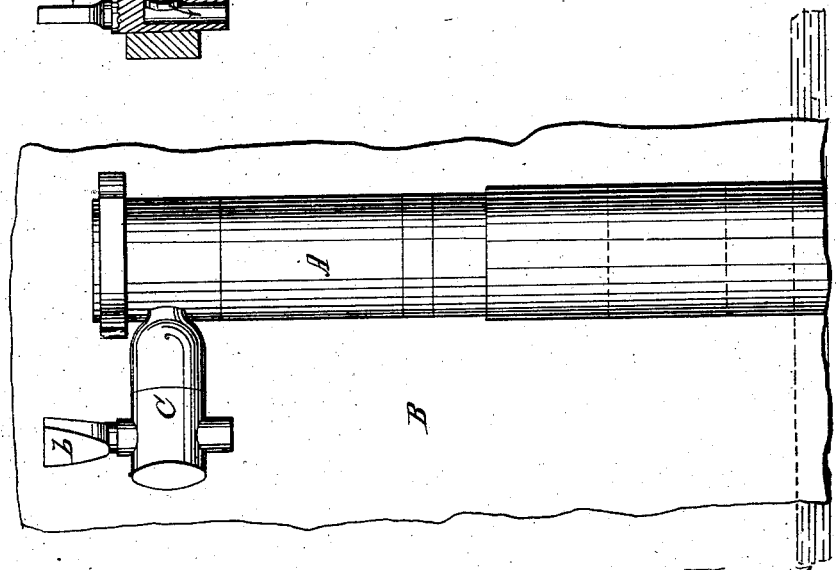
Witnesses:
Theo Busch
J. A. Service
Inventor:
Peter F. Schenck
Per Munn & Co
Attorneys.

United States Patent Office.

PETER F. SCHENCK, OF RICEVILLE, NEW JERSEY.

Letters Patent No. 65,953, dated June 18, 1867.

---

IMPROVED APPARATUS FOR SUPPLYING AIR TO LIFE-BOATS.

---

The Schedule referred to in these Letters Patent and making part of the same.

---

TO ALL WHOM IT MAY CONCERN:

Be it known that I, PETER F. SCHENCK, of Riceville, in the county of Monmouth, and State of New Jersey, have invented a new and improved Apparatus for Supplying Air to Life-Boats; and I do hereby declare that the following is a full, clear, and exact description thereof, which will enable others skilled in the art to make and use the same, reference being had to the accompanying drawings, forming a part of this specification, in which—

Figure 1 is a perspective view of the air-tube containing my improved apparatus for supplying fresh air to life-boats.

Figure 2 is a central longitudinal section of the same when in proper position for operating to supply air.

Figure 3 is the same view when the apparatus is reversed and not in position for operating to supply air.

Similar letters of reference indicate like parts.

The object of this invention is the saving of human life in case of shipwreck, by supplying a life-boat or vessel with fresh air for the respiration of passengers contained in the vessel which is otherwise hermetically sealed, while at the same time the sea water shall be effectually excluded. The apparatus for this purpose consists of air-tubes secured in the sides of the vessel with one end on the inside and the other on the outside, placed, when the vessel is righted in a vertical or nearly vertical position, with the lower end above the water-line. The principle of operation is the contrary action of two or more ball valves of different specific gravity, one of which balls made of metal, being heavier than water, shall sink and close the seat of a passage against the admission of water when the vessel is in one position, and the other ball, made of wood, cork, or other substance lighter than water, shall float and close the seat of a passage to exclude the water under certain conditions, while neither the heavy nor light balls shall operate as closing valves against the free passage of air into the vessel under other conditions.

B represents the inside of the hull of a life-boat, provided with air-tight chambers which contain the passengers, and A is a straight air-tube made of brass or other suitable metal several inches in diameter, passing through the vessel's side, and placed vertically to the water line with the outside end of the tube above the water level, as high as the deck will allow the inner end to be placed within the vessel. This tube may be arranged in the side of the vessel by letting the two ends into proper cavities in the hull of the vessel, the lower end into a recess on the outside, and the upper end of the tube into a recess on the inside of the vessel, as shown in fig. 1. The air-tube A is divided into transverse sections, joined by screwing the ends into each other, to form two valve-chambers 1 2, with air-passages connecting them and also running to and from them. In the chamber No. 1, in the lower end of the tube, fig. 2, is placed a wooden or cork ball, W, and in the chamber No. 2, is placed a metal ball, M. The lower end of the tube A is open for the admission of air from the outside of the vessel up through the passage $a$, which enters the lower side of valve-chamber No. 1, where the said air-passage $a$ terminates in a seat upon which the wooden ball W may rest, while the air can pass up into the lower chamber through small holes or air-passages by its side, and thence pass up through the passage $a^1$ into the valve-chamber No. 2, through similar small air-passages by the side of the metal ball M, which rests on a similar seat in the lower side of this upper valve-chamber. The air will continue to pass forward through the passage $a^2$ into a side branch or spout, C, which opens into the inside of the life-boat. This movement of the air through the tube A, indicated by arrows fig. 2, depends on the position of the vessel being such that the lower end of the tube shall be above the water level, where the sea cannot enter it. But the terms of the problem proposed for solution by this apparatus, are the complete exclusion of the sea water under all conditions and positions of the vessel, while provision is also made for the admission of air into the vessel. Now if the vessel becomes submerged, although keeping an even keel, the water will rush up through the lower end of the tube, and if not stopped in its passage through the tube would flow into the life-boat and fill it; but when the water in such a case strikes the wooden ball W, the ball will float and rise with the water against the upper side of the chamber No. 1, where it will enter a conical seat, and acting as a valve will close the passage $a^1$ against the entrance of the water any further. This then is the office of the light ball valve W to shut out the water when it rises in the tube A, as shown in red, fig. 2. If, however, the vessel should capsize, the conditions would be changed and the float ball valve W would not operate. In this case the water will also rush into the reversed end of the tube A, and pass through the chamber No. 1, and the passage $a^1$ into the chamber No. 2, but it cannot pass any further, because the metal ball M will then have settled into a conical seat at the mouth of the passage $a^2$, and stopped it effectually, as shown in fig. 3. This is the office of the heavy ball valve M, to stop the passage of the water through the tube A when the vessel upsets. As a further provision against the passage of water into the vessel when she lies over on her side by rolling, a chamber, No. 3, is made in the spout C, which has a conical valve-seat at each end. A metal ball, N, is placed in this chamber, by the side of which the air can pass under ordinary circumstances, but when the vessel lies over on her side either way, the metal ball N will roll into the seat at one or other end of the chamber No. 3 and close it, thus shutting out the water effectually if any should pass the other valves. Still further to guard against accidental disarrangement or inoperativeness of all the valves, the branch pipe or spout C is provided with a faucet or thumb-valve, $b$, by which the passengers in the vessel can shut off the water when actually necessary.

These air-tubes may be made of any size and in any number, and adapted to vessels properly constructed for the wrecking service, and thus the admission of an abundance of fresh air may be supplied to an air-tight life-boat. A series of these air-tubes will be arranged to operate when the vessel is upside down by reversing their position, as well as when she sets even on her keel, and every position in which a vessel may be placed can be provided for by air-tubes in a corresponding position.

Having thus described my invention, what I claim as new, and desire to secure by Letters Patent, is—

An apparatus consisting of tubes containing ball valves of different specific gravity, adapted to operate in combination with a closed life-boat, for the purpose of admitting fresh air therein and excluding water therefrom, substantially as described.

PETER F. SCHENCK.

Witnesses:
WM. F. MCNAMARA,
ALEX. F. ROBERTS.